US009152436B2

(12) United States Patent
Momchilov

(10) Patent No.: US 9,152,436 B2
(45) Date of Patent: Oct. 6, 2015

(54) GESTURE SUPPORT FOR SHARED SESSIONS

(75) Inventor: Georgy Momchilov, Coconut Creek, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 795 days.

(21) Appl. No.: 13/253,646

(22) Filed: Oct. 5, 2011

(65) Prior Publication Data
US 2012/0084670 A1 Apr. 5, 2012

Related U.S. Application Data

(60) Provisional application No. 61/389,985, filed on Oct. 5, 2010.

(51) Int. Cl.
*G06F 17/00* (2006.01)
*G06F 9/44* (2006.01)
*G06F 3/0488* (2013.01)
*H04W 4/02* (2009.01)
*H04W 4/20* (2009.01)

(52) U.S. Cl.
CPC .......... *G06F 9/4445* (2013.01); *G06F 3/04883* (2013.01); *H04W 4/023* (2013.01); *H04W 4/206* (2013.01)

(58) Field of Classification Search
CPC .................. G06F 3/04883; H04L 12/1822
USPC ........................... 715/233, 273, 753
See application file for complete search history.

(56) References Cited

U.S. PATENT DOCUMENTS

| 5,583,993 | A | 12/1996 | Foster et al. |
| 7,725,547 | B2* | 5/2010 | Albertson et al. ............ 709/206 |
| 8,286,102 | B1* | 10/2012 | Wilensky ...................... 715/863 |
| 8,446,297 | B2* | 5/2013 | Marggraff et al. .............. 341/20 |
| 2002/0056577 | A1* | 5/2002 | Kaye et al. .................. 178/18.03 |
| 2003/0071850 | A1* | 4/2003 | Geidl ............................ 345/781 |
| 2005/0273700 | A1 | 12/2005 | Champion et al. |
| 2007/0124382 | A1* | 5/2007 | Hughes ........................ 709/205 |
| 2007/0168423 | A1* | 7/2007 | Park et al. .................... 709/204 |
| 2008/0059578 | A1* | 3/2008 | Albertson et al. ............ 709/204 |
| 2008/0143975 | A1* | 6/2008 | Dennard et al. ................ 353/42 |
| 2008/0245862 | A1* | 10/2008 | Dennard et al. .............. 235/383 |

(Continued)

FOREIGN PATENT DOCUMENTS

CN 1474540 A 2/2004
CN 101005600 A 7/2007

(Continued)

OTHER PUBLICATIONS

International Search Report and the Written Opinion from Corresponding PCT/US2011/054963 dated Dec. 21, 2011.

*Primary Examiner* — Stephen Hong
*Assistant Examiner* — Marshon Robinson
(74) *Attorney, Agent, or Firm* — BainwoodHuang

(57) ABSTRACT

Methods and systems for providing gesture support for shared sessions are shown and described. One method includes facilitating the establishment of a first and second connection with a first and second computing device, negotiating gesture capabilities with the first and second computing devices, receiving gesture inputs from the first and second computing devices, reconciling the gesture inputs, and transmitting a modified shared session window to the first and second computing devices.

62 Claims, 7 Drawing Sheets

(56) References Cited

U.S. PATENT DOCUMENTS

| | | | |
|---|---|---|---|
| 2009/0292989 A1* | 11/2009 | Matthews et al. | 715/702 |
| 2009/0319894 A1* | 12/2009 | Markiewicz et al. | 715/702 |
| 2010/0083190 A1* | 4/2010 | Roberts et al. | 715/863 |
| 2011/0022677 A1* | 1/2011 | Hughes | 709/213 |
| 2011/0202834 A1* | 8/2011 | Mandryk et al. | 715/701 |
| 2012/0026100 A1* | 2/2012 | Migos et al. | 345/173 |
| 2012/0042008 A1* | 2/2012 | Christianson et al. | 709/203 |
| 2012/0166522 A1* | 6/2012 | MacLaurin et al. | 709/203 |

FOREIGN PATENT DOCUMENTS

| | | |
|---|---|---|
| WO | WO 02/39308 A1 | 5/2002 |
| WO | WO 2007/103387 A2 | 9/2007 |

\* cited by examiner

GESTURE SUPPORT FOR SHARED SESSIONS

INCORPORATION BY REFERENCE

The present application is related to and claims priority from U.S. Provisional Patent Application Ser. No. 61/389,985, filed Oct. 10, 2010, entitled "MULTI-TOUCH SUPPORT FOR SHARED SESSIONS," which is hereby incorporated by reference as fully set forth herein.

FIELD OF THE DISCLOSURE

This disclosure generally relates to gesture support for shared sessions. In particular, this disclosure relates to handling remote gesture input in a shared session.

BACKGROUND OF THE DISCLOSURE

Mobile devices such as smart phones and tablet computers, can execute operating systems that are touch, multi-touch, or stylus friendly. These operating systems often allow users to interface with menus and applications using a touch screen with either a finger or other means or a stylus as an input device. Touch friendly devices can be used in web conference applications, including shared sessions such as shared electronic white boards.

SUMMARY OF THE DISCLOSURE

Described herein are methods, systems, and devices for providing a shared session environment. In one embodiment, a method for providing a shared session environment includes the steps of facilitating the establishment of a first connection with a first remote computing device to provide access to a shared session window to the first device; facilitating the establishment of a second connection with a second remote computing device to provide access to the shared session window to the second device; negotiating gesture capabilities with the first (and possibly a second remote computing device if it is gesture capable); receiving via the first connection data corresponding to a first gesture inputted at the shared session window displayed at the first device to interact with the shared session window; receiving via the second connection data corresponding to a second gesture (or non-gesture) inputted at the shared session window displayed at the second device to interact with the shared session window; reconciling the data corresponding to the first and second gestures (or gesture and non-gesture if the second computing device is not compatible with gesture inputs) to generate a modification instruction representing the operations defined by the interactions with the shared session windows at the first and second remote computing devices; and transmitting a modified shared session window over the first and second connections to the first and second devices.

In various embodiments, the method may include the steps of obtaining a first normalization timestamp from the first device and a second normalization timestamp from the second device; wherein the reconciliation step further comprises aligning a timestamp of the received first gesture based on the first normalization timestamp, and aligning a timestamp of the received second gesture based on the second normalization timestamp.

In various embodiments, the reconciling step comprises employing a mapping table that maps the data corresponding to the first gesture to a first shared session command and that maps the data corresponding to the second gesture to a second shared session command. In other embodiments, the first connection comprises a screen sharing channel and a first input channel and the second connection comprises the screen sharing channel and a second input channel.

In various embodiments, the reconciling step may include, determining a difference in time of receipt between the first and second gestures, and discarding one of the first and second gestures in response to determining that the difference in time is lower than a threshold amount of time.

The data corresponding to the first gesture may be raw multi-touch information. The reconciling step may further include formatting the raw multi-touch information into a format compatible with the shared session window. The formatting may account for the negotiated gesture capabilities for the first remote computing device.

The negotiating step may include aggregating the capabilities of the first and second remote computing devices. The aggregating the capabilities may include summing the number of touch inputs the first remote computing device is capable of receiving and the number of touch inputs the second remote computing device is capable of receiving.

In various embodiments, the data corresponding to the first gesture is formatted for interpretation through processing of raw multi-touch information at the first remote computing device. In still other embodiments, the data corresponding to the first gesture is a flick. In other embodiments, the first gesture is a stylus event coming from a pen or finger touch.

In certain embodiments, the reconciling step further comprises queuing, tossing, and/or coalescing the first and/or second gestures in low-bandwidth network conditions and/or slow-processing applications in the shared session.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

DETAILED DESCRIPTION OF THE DRAWINGS

Figure 1A:
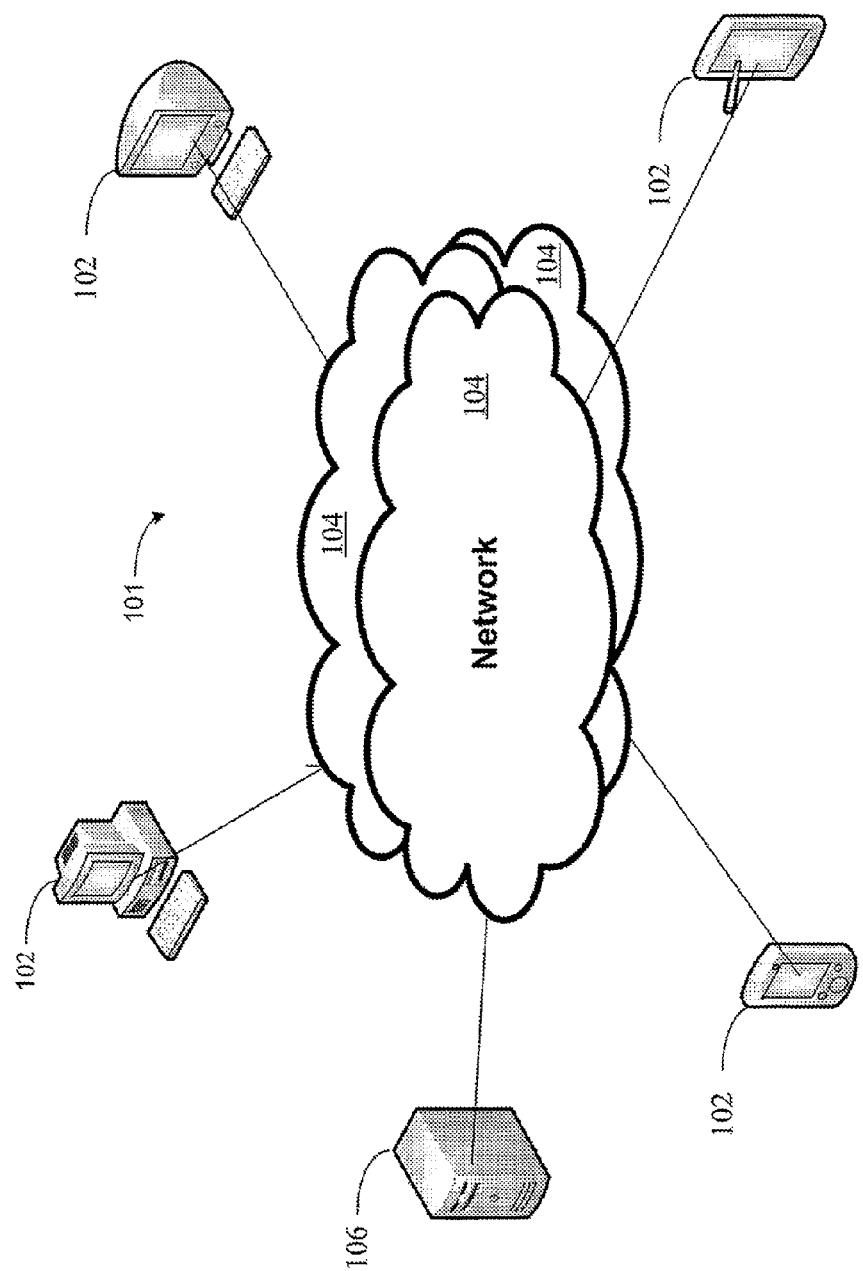
FIG. 1A depicts embodiments of network environments that provide remote access to computing devices that can execute application programs.

FIG. 1A illustrates one embodiment of a shared session or on-line collaboration environment 101 that includes one or more client or participant devices 102 connected a server 106 through one or more networks 104. The server 106 and client participant devices 102 can be any computing device, including, but not limited to, computers, tablets, mobile phones, or virtual machines. The server 106 and client participant devices 102 can support gestures. Gestures, as that term is used herein, include touch (e.g. touching a finger to an I/O display), swipes (e.g. touching and moving a finger on an I/O display), multi-touch (e.g. touching two or more fingers to an I/O display), multi-swipe (e.g. touching and moving two or more fingers on an I/O display), stylus (touching or swiping a pen-type device on an I/O display), action (moving fingers in front of a camera), flick (described in more detail below), etc.

In one embodiment, the environment 101 can include an appliance (not shown) installed between the server 106 and devices 102. This appliance can manage client/server connections, and in some cases can load balance client connections amongst a plurality of backend servers (not shown).

In various embodiments, this environment 101 can provide a session shared between multiple devices 102, including, for example, a shared electronic whiteboard space. Such a shared session may be included in or added to web conferencing applications such as GOTO MEETING, WEBEX, MICROSOFT LIVE, LOTUS SAMETIME, WEBHUDDLE, TOKBOX, OPENMEETINGS, or any other web conferencing applications. Web conferencing applications typically allow multiple users to convene in a common place and can permit users to share, display, and interact with content in a shared session or a shared space. As used herein, a shared session or shared space refers to a window executing at a server 106 with which participant devices 102 can interact, such as, for example, a shared electronic whiteboard.

Figure 1B:
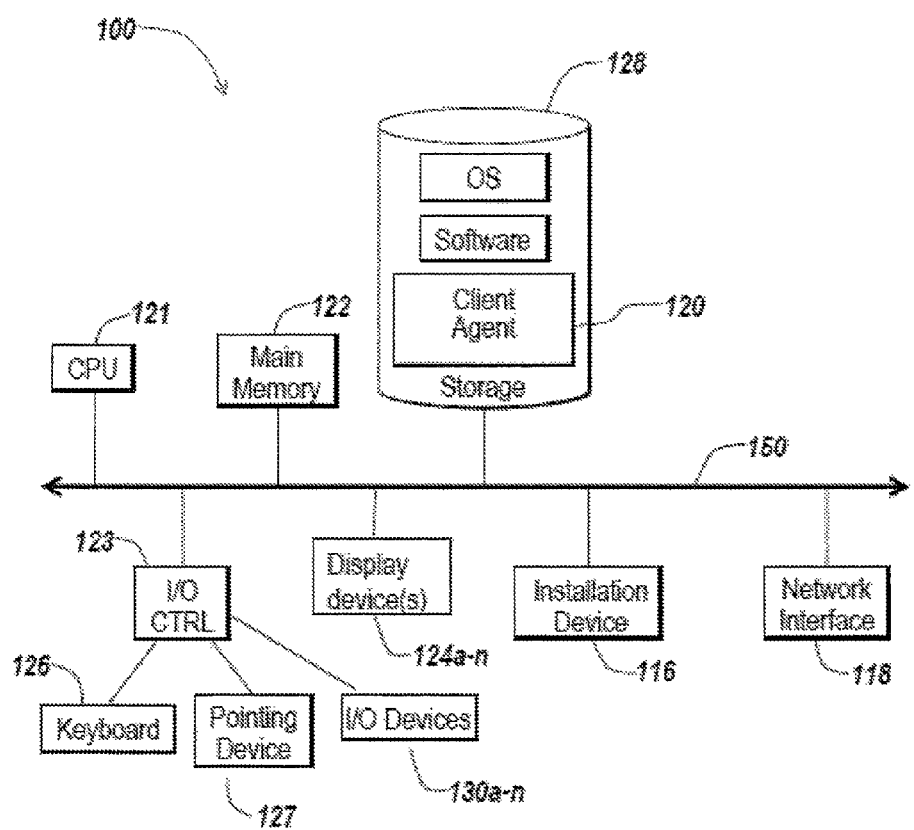
FIG. 1B and FIG. 1C are block diagrams that depict embodiments of computing devices.

FIG. 1B illustrates one embodiment of a computing device 100, which can be employed as a client machine 102 or a server 106. In this embodiment, the computing device 100 may have one or more displays 124a-n, one or more I/O devices 130a-n, a network interface 118, a keyboard 126, a pointing device 127, a central processing unit 121, and/or storage storing software 128. In one embodiment, such as for a computing device 100 that is a tablet or mobile phone, a display device 124a may also be an I/O device 130a.

Figure 1C:
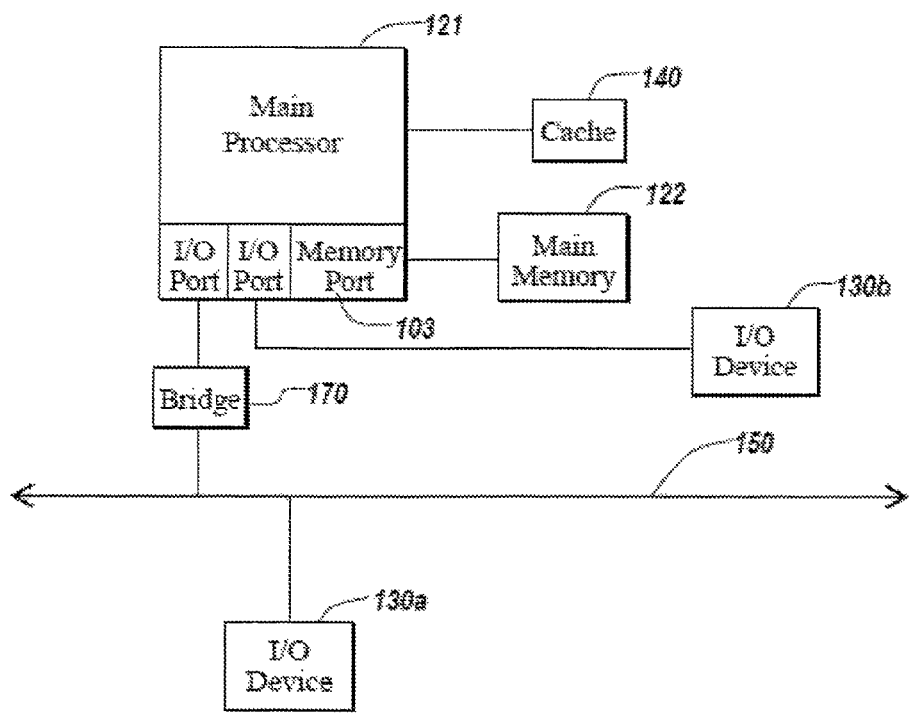

FIG. 1C illustrates another embodiment of a computing device 100, which can be employed as a client machine 102 or a server 106. Included within the computing device 100 is a system bus 150 that communicates with the following components: a bridge 170, and a first I/O device 130A. In another embodiment, the bridge 170 is in further communication with the central processing unit 121, which can further communicate with a second I/O device 130B, a main memory 122, and a cache memory 140. Included within the central processing unit 121, are I/O ports, a memory port 103, and a main processor.

Figure 2:
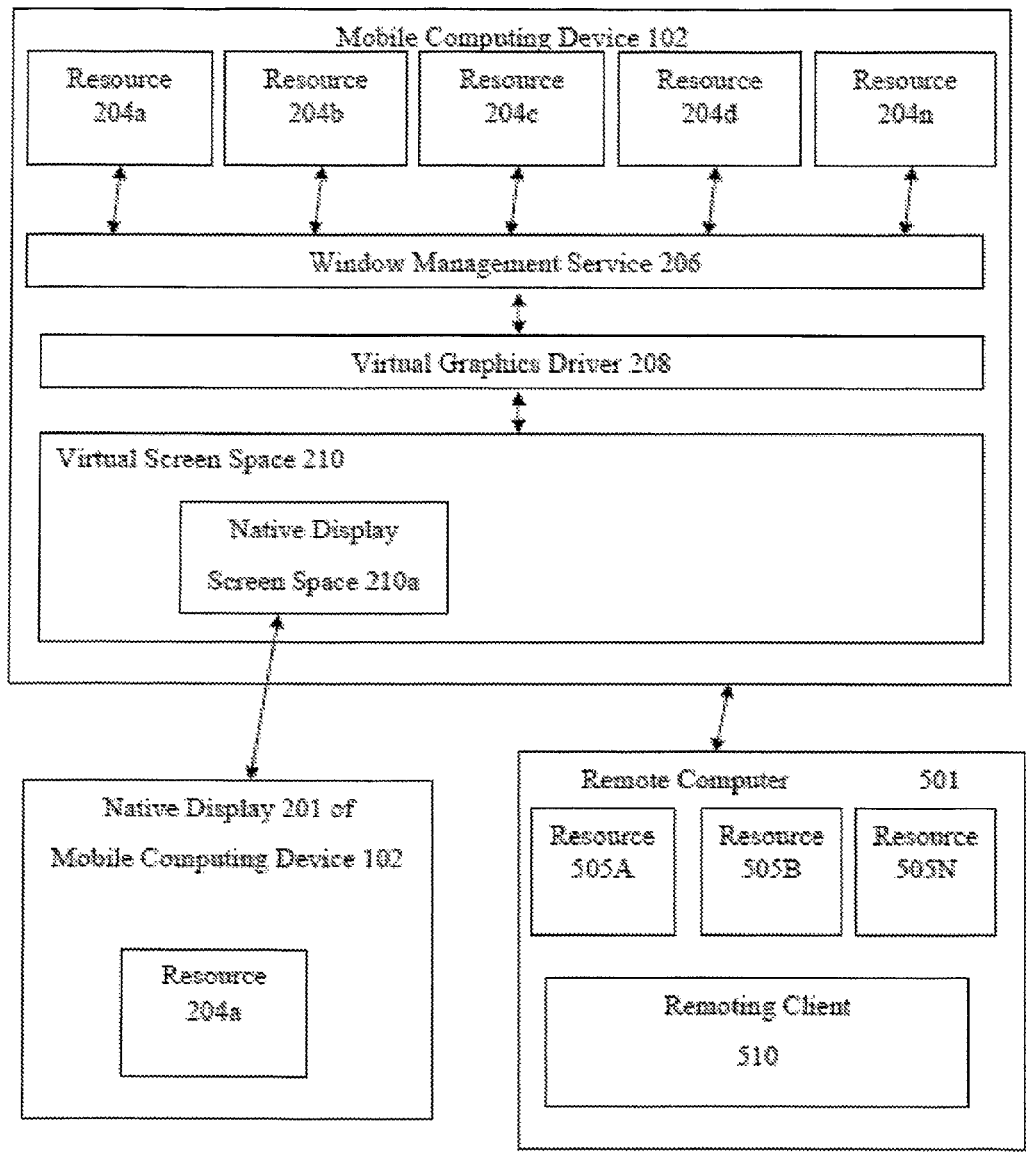
FIG. 2 is a block diagram depicting an embodiment of a system for displaying a remote application on a mobile device.

Illustrated in FIG. 2 is a block diagram of an embodiment of a participant device 102. The device 102 executes applications such as a windows management service 206. The windows management service 206 can communicate with the applications 204 executing on the device 102 and, in some embodiments, with a virtual graphics driver 208. The primary role of the windows management service 206 is to interface the display 201 and I/O devices 126, 127, 130 of a device 102 with the applications executing, either locally or remotely, in windows on the device 102. As shown, not all of the applications 204a-n executing on a device 102 are displayed 204a on the display 201 of the device 102. The devices in FIGS. 1A, 1B, 1C, and 2 may receive and process gesture inputs (e.g. a mobile phone, tablet, or other gesture sensitive device).

In some embodiments a server 106 is a remote computing device 501 that executes one or more applications 505A-N. In a web conferencing environment for shared collaboration 101, one such application may be a shared session window, such as a shared electronic whiteboard space. In one embodiment of a web conferencing application with a shared session window, different channels between participants 102 and server 106 carry different types of communications between the participants 102 and server 106.

For example in an on-line meeting environment, a first channel may carry screen data and a second channel, which may be shared, may provide real-time communications among the participants. In another example, a device 102 can communicate with a server 106 over one or more virtual channels. In some embodiments, a first channel established over the network 104 can be referred to as a control virtual channel. In some embodiments, a second channel established over the network 104 can be a seamless virtual channel. A control virtual channel can be used to send control commands and other miscellaneous commands while a seamless virtual channel can be used to send a shared space window, application window, taskbar, systray, etc. In some embodiments, the first channel can be used to transmit gesture commands. Thus, each virtual channel can carry different functions and content.

In some embodiments, the virtual channel(s) can be established by one or both of a participant device 102 or a server 106. In one embodiment, a window management service 206 executing on a mobile device 102 or a remoting client 510 executing on a remote computer 106 can be used to establish the virtual channel(s).

In some embodiments, a remote computer 501 can execute a remoting client 510. The remoting client 510 can be in communication with a control virtual channel or a seamless virtual channel and can transmit and receive data to and from the mobile device 102. In some embodiments, the remoting client 510 can collaborate with the window management service 206 to modify remote applications 505 executing on the remote computer 501, such as a shared session window, for remote display on the mobile device 102. The window management service 206, in some embodiments, is CITRIX RECEIVER published by CITRIX SYSTEMS.

In one embodiment, participant software stored in storage 128 of a client device 102 is in communication with various components (e.g., the operating system) of the participant 102 to provide these and other features to the software and device. For example, the participant software can create and maintain a local copy of a shared channel. The participant software may also provide a means to read and write data to a virtual channel and transmit changes to other participants 102 and/or the server 106. The participant software may also provide a means to read from a screen data channel and/or a seamless virtual channel.

In one embodiment, server software in storage 128 of a server 106 is in communication with various components (e.g., the operating system) of the server 106 to provide these and other various features to the software and server 106. For example, the server software may create a shared channel and maintain a local copy of the shared channel state. The server software may provide a means to transmit screen data to participants over a screen data channel or a seamless virtual channel.

In an embodiment disclosed herein, clients or participants 102 that support gestures may participate in a shared session. Examples of such gesture inputs include touch, multi-touch, stylus, or other type of input. Such devices 102 include tablets, PDAs, and mobile phones. Gesture inputs may be digitized by a digitizer located at the device 102.

The device 102 can execute an application 204 configured to accept a gesture input. This application 204 may natively accept gesture inputs or can be modified to do so. For example, an application 204 can receive data inputted by a user via a touch screen of the device 102 and can be modified to accommodate typical touch screen input functions like a virtual keyboard and a virtual scroll menu.

Figure 3:
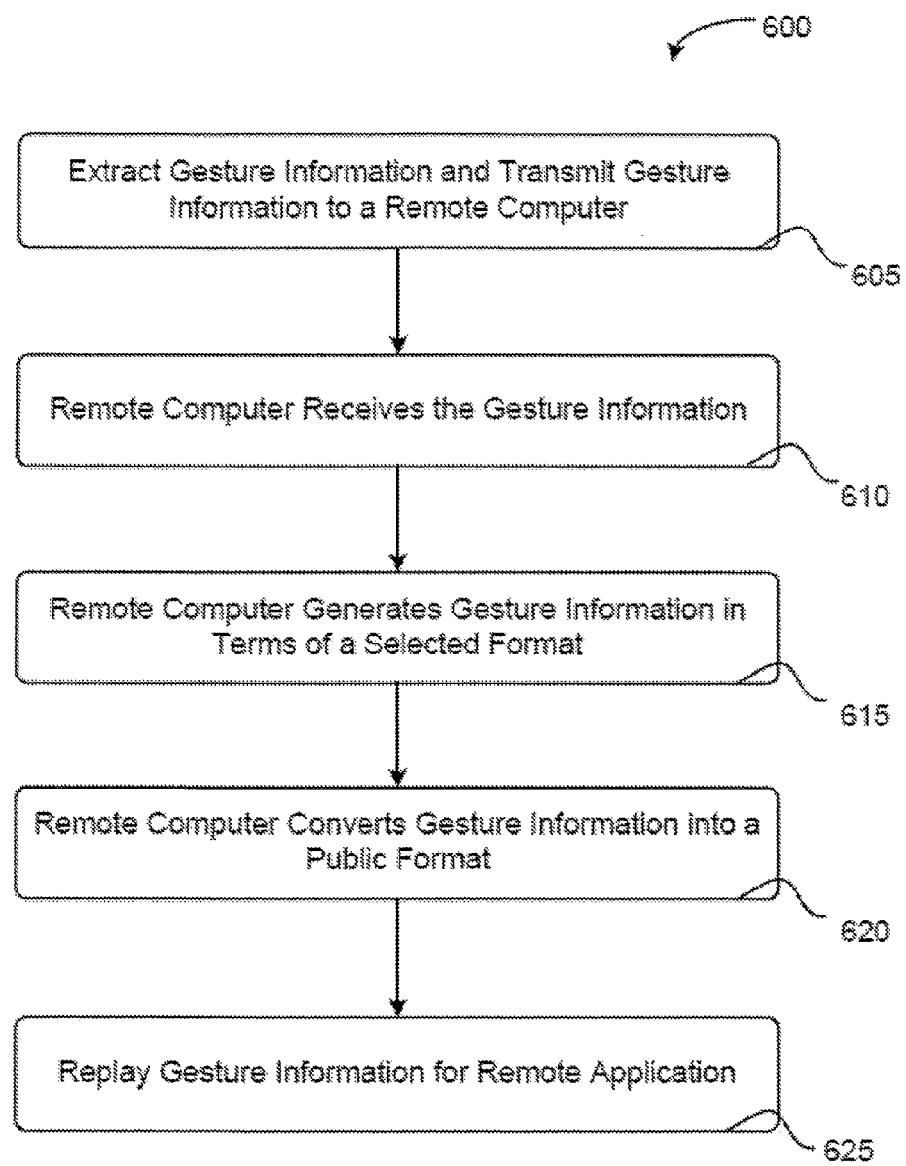
FIG. 3 is a flow diagram depicting an embodiment of a method for providing multi-touch support.

Illustrated in FIG. 3 is one embodiment of a method 600 for remotely providing gesture information to a remote application 505, such as a shared session window, executed at a remote computer 501, such as a server 106. A window management service 206 executing on the mobile device 102 can extract gesture information and transmit the extracted information to a remote computer 501 (Step 605). The remote computer 501 can receive the gesture information (Step 610) and then generate new gesture information in terms of a selected format (Step 615). The remote computer 501 can then convert the gesture information into a public format (Step 620) and can replay the gesture information for a remote application 505 (Step 625) executing on the remote computer 501.

In one embodiment the window management service 206 can extract gesture information from an input at the mobile device 102 and transmit the information to a remote computer 501 (Step 605). In some embodiments, when one or more gesture inputs are issued to an application window, an operating system executing on the mobile device 102 forwards the events to a corresponding application. The application window can be a window of a locally executing application, can be a window displaying a remotely executing desktop or can be a window displaying a remotely executing application. In many instances, the operating system can receive gesture input issued to any application window displayed on the mobile device 102.

In some embodiments the operating system determines that the gesture input is issued to an application window that ignores the input. For example, this window can display a remote application or desktop that is incapable of handling gesture input. Ignoring the input can cause the invocation of a default window procedure, which handles the input by trying to convert the gesture input into mouse events.

In some instances, the window management service 206 can be modified to include a sub-function or module that can handle gesture events. This modification can cause the window management service 206 to intercept gesture events issued to an application window corresponding to a remotely executing application or desktop, and transmit the intercepted gestures to a remote computer 501. In some embodiments, the window management service 206, in response to intercepting or detecting a gesture input message, can extract information about the gesture or touch input.

Once the gesture information is intercepted or retrieved and transmitted to the remote computer 501, the remote computer receives the gesture information (Step 610) and generates gesture information in terms of a selected format (Step 615). In some embodiments, the remoting client 510 or a digitizer executing on the remote computer 501 can create gesture information directly in terms of a public gesture structure or in another format. Upon creating the gesture information, the remoting client 510 can send the gesture event or gesture information to a target window for an application 505, such as the shared session window.

A function can be called to notify an operating system of the supported gesture types and configurations by passing the operating system an array of memory structures that define disabling/enabling messages for a certain gesture. For example, memory structures can be passed to the operating system such as memory structures defining aspects of the following gestures: panning; rotation; inertia; etc. The structures can control aspects of the gestures such as allowing for horizontal but not vertical panning, or not permitting inertia. Upon sending the operating system these memory structures, the operating system can then be configured to support the particular gestures defined in the memory structures for a specific application window. In some embodiments, the remote computer 501 can remote these calls to the mobile device 102, and the mobile device 102 applies the memory structures passed during the function call to an operating system executing on the mobile device 102. This may be accomplished when the window management service 206 on a mobile device 102 calls the function on the application window displayed on the mobile device 102.

For example, if the shared session window fails to support rotation, then the remote computer 501 can transmit a memory structure which identifies that the application output window associated with that shared session does not support rotation. This function call is transmitted to the mobile device 102 which in turn issues a local function call having an argument that states that rotation is not supported, to an application output window displaying the application output generated by the instance of the shared session executing on the remote computer 501.

In some embodiments, if the window management service 206 intercepts or receives a gesture message from an operating system executing on the mobile device 102 and issued to an application window displaying a remotely executing application or desktop, such as a shared session window, the window management service 206 can block a return from a local message handler. The window management service 206 can then transmit the WM_GESTURENOTIFY message to the remote computer 501 where the message is replayed for the shared session corresponding to the shared session window at the mobile device 102.

In some embodiments, method 600 can include a different set of steps which include transmitting gesture input regardless of whether the application window receiving the input is capable of handling gestures. In these embodiments, the window management service 206 can intercept all gesture events and send those events to a remote computer 501 where they are replayed for the corresponding remote application 505, such as a shared session window. In instances where the remote application cannot handle touch input, the input or messages are propagated to a default window procedure which causes an operating system executing on the remote computer 501 to try and convert the touch input into mouse events. For example, a vertical panning gesture can cause the operating system to detect scroll bars and perform corresponding Ctrl-Scroll Wheel generation. The operating system can also detect editable areas in the application window and upon receiving the touch input can show a touch keyboard option, etc.

In some embodiments, the method 600 can be used in conjunction with high-fidelity applications or applications that require the customized handling of raw touch events. Just like gesture multi-touch input, applications can register a window as capable of receiving raw multi-touch input. When an application registers a window as capable of receiving raw input, the removing client 510 can forward the call to the mobile device 102 which in turn advertises a corresponding window as touch-capable. This function call can include any number of configuration parameters, such as: turn off coalescing and turn on fine touch so that the coalescing of raw touch input becomes responsibility of the handling application; disable palm rejection which blocks messages from accidental palm contact; and any other configuration parameters.

In other embodiments, the mobile device 102 can remote touch events that are issued to windows registered to accept raw touch input. When the mobile device 102 sends the touch input, the window management service 206 or other client application executing on the mobile device 102 extracts the raw touch information. In some embodiments, the mobile device 102 also sends an identifier for the touch contact sequence from the point a contact comes down until it comes back up. This identifier allows for multiple simultaneous sequences or multi-touch (multiple lingers or people); X and Y coordinates to the hundredth of a pixel of physical screen coordinates. This provides high precision for applications that require fine resolution (e.g. handwriting recognition); width and height of contact area; timestamp; whether this is a primary touch point, e.g. first touch point established; various aspects of the touch point/sequence such as down, move, up or hover events, whether input was coalesced, whether it was from the user's palm, etc.; and a device handle that can be used to retrieve information about the input device. In some embodiments, the device handle can be used to retrieve information about the mobile device. After the remote computer 501 receives the touch input, the computer 501 can replay the touch input to a corresponding application window on the remote computer 501.

Figure 4:
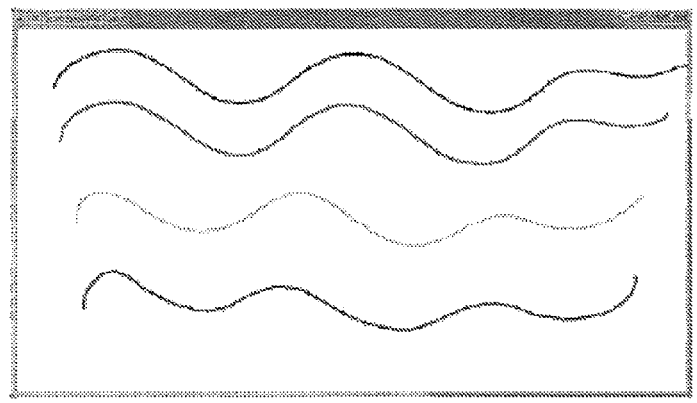
FIG. 4 is a screen shot of multiple, simultaneous touch inputs.

Illustrated in FIG. 4 is an embodiment of a screen shot of a shared session application window, such as a whiteboard, that supports multi-touch input. The multiple lines on the scratch pad correspond to different touch input, e.g. four fingers or four styluses from one or more users on a participant device 102 and/or from one or more participant devices 102. Further, the multiple lines illustrate inputting multiple touch events simultaneously. The methods and systems described herein can support any number of simultaneous multi-touch inputs. In some embodiments, this support may be limited only by the hardware of the mobile device 102, the operating system of the mobile device 102 or the drivers of the mobile device.

Figure 5:
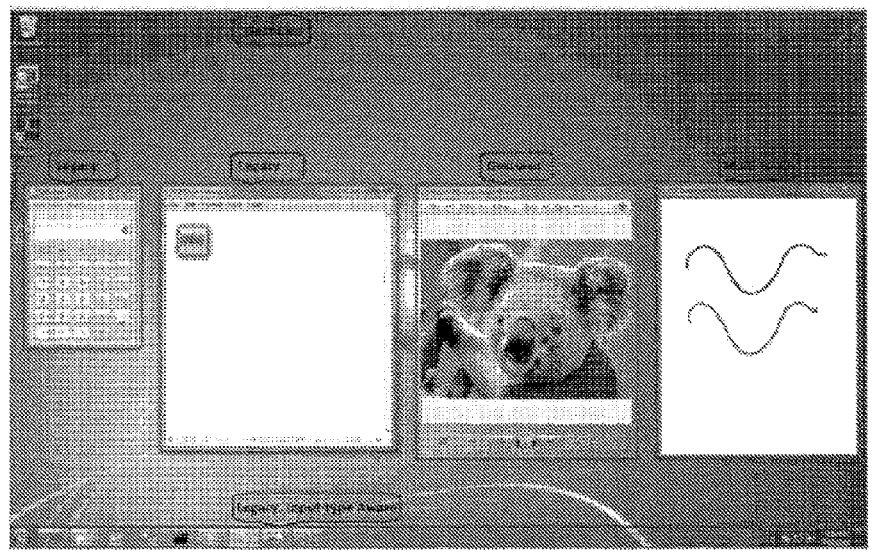
FIG. 5 is a screen shot of a remotely provided desktop environment with a shared session window.

Illustrated in FIG. 5 is an embodiment of a screen shot of an application of the methods and systems to a desktop environment of a web conferencing application with a shared electronic whiteboard space. In one embodiment, the desktop environment can include both windowed, full-screen and multi-monitor window modes. Touch can be negotiated on a per window basis, thus different levels of touch can be allocated to different windows in the desktop and windows within the desktop can be modified while other windows remain the same. As shown in FIG. 5, a shared session application window, such as a whiteboard, is shown at the right.

In one embodiment, the methods and systems described herein can include a method for obtaining the touch screen capabilities of an input digitizer, e.g. an input digitizer of a mobile device 102. A window management service 206 or remoting client 510 can use a an API to query the gesture capabilities of devices in the environment 101, such as support for multi-touch, pen or touch, whether the device 102 is ready, whether it is integrated or external. In some embodiments, the received information can inform the window management service 206 about the touch capabilities of the mobile device 102. These capabilities can be transmitted to a remote computer 501 where they can be used by remote applications, such as a shared session, to negotiate acceptable inputs and commands. Upon querying for the capabilities, the remote computer 501 can receive the capabilities and make them available to applications executing on the remote computer 501.

The methods and systems described above, in some embodiments, can support coordinate translation. An application output window displayed on a mobile device 102 and displaying application output generated by a remotely executing application, e.g. a shared window, can in some instances assume a null initial position of [0,0]. Further, the shared window can create a remote session that has substantially the same resolution as the display of the mobile device 102. This resolution, in some embodiments, can be the combined desktop resolution for multi-monitor environments. When the application output window displays portions or a whole remote desktop, the application output window can have offset coordinates relative to the local physical display. In some instances, this can be true for both windowed and even full-screen remote desktop (in the case of a multi-monitor environment.). Accurate handling of gesture input can therefore require the mobile device 102 or the window management service 206 to translate physical screen coordinates into logical screen coordinates before sending them to the host as part of gesture or raw touch events. For example if the physical coordinates of a gesture input are [PhysicalX, PhysicalY] and the remote desktop's top left corner is at physical offset [DesktopX, DesktopY], then the logical coordinates within the desktop, which are sent to the host, are [PhysicalX−DesktopX, PhysicalY−DesktopY].

In addition to coordinate translation, the mobile device 102 or the window management service 206 can perform coordinate scaling. For example, for a gesture input issued to a window that has a position from the top left corner at [WindowX, WindowY] and scaled at a factor [ScaleX, ScaleY], the resulting logical coordinate sent to the host can be: [WindowX−DesktopX+(PhysicalX−WindowX)/ScaleX, WindowY−DesktopY+(PhysicalY−WindowY)/ScaleY]. Similar translations and scaling can be performed for panning or scaling a desktop window to fit a mobile device 102 window size.

In other embodiments, the methods and systems described above can support three-dimensional image shared sessions, e.g. three dimensional images and desktops that use three dimensional images such as Aero technology. In these embodiments, three dimensional drawings can be transmitted from the remote computer 501 to the mobile device 102.

In still other embodiments, the methods and systems can achieve substantially zero-latency in an environment having a high latency connection. Achieving substantially zero-latency can include permitting a window management service 206 or other client application executing on the mobile device 102 to provide local feedback to application windows 204 displaying remotely executing applications 505, such as a shared session window. This local feedback can be determined based on historical or approximated information and in some instances can be followed by true feedback from the remotely executing application. Configuring a window management service 206 or other client application to be able to respond locally can include communicating to the window management service 206 or other client application the capabilities of a window and the application's ability to handle specific gestures.

For example, if a window can handle scrolling and zooming and it is determined that the network latency is above a predetermined threshold, the window management service 206 or other client application can perform a gesture substantially immediately upon detecting the gesture. Additionally, the window management service 206 or other client application can transmit the gesture to the remote application which can handle the gesture as well. In these embodiments, the window management service 206 or other client application can handle the gesture locally using graphics from a video or image buffer and by performing StretchBitBit or BitBit operations on the application window.

For example, the window management service 206 or other client application could zoom in on a picture displayed in the application window but could permit the title and borders of the window to remain intact. Once the remote application 505 handles the gesture, the remote application 505 can transmit the application output to the mobile device 102 which receives the application output and updates the application window 204 to display the application's true response to the gesture input.

In yet other embodiments, the methods and systems described herein can support queuing and tossing such that a window management service 206 or other client application can coalesce raw touch input events to prevent overloading a transmission pipeline and to preserve the interactivity of the session. Coalescing can be achieved by measuring a bandwidth of a network, transmitting information from a client to a remote computer over the network at a particular rate, and limiting the size of the local client raw touch input queue by dropping events. Coalescing might also be used when the speed of application 505 execution, e.g., of gesture input events processing, is slow. For example, in some cases, applications 505 might be slow in interpreting the gesture input, even though bandwidth to the server 106 may be sufficient, e.g., if the server load is high, in which case the remoting client 510 on the server 106 might coalesce the input in order to preserve interactivity of the application. Without coalescing, the application might be busy digesting a potentially long queue of stale gestures and reacting with a delay to the user.

Figure 6:
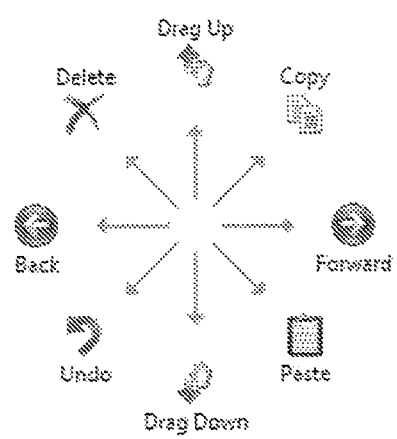
FIG. 6 shows a diagram of eight pen flicks that correspond to their flick actions.

In various embodiments of the present disclosure, a gesture input may be a flick. FIG. 6 demonstrates an example of flick gestures. Flicks are quick, linear pen (or single finger) movements associated with scrolling actions and commands. In addition to gesture input, flicks are also remoted from a participant device 102 to a server 106 executing a corresponding remote application window in the host session 505, such as the shared session window. Flicks can coexist with normal user actions such as left and right taps, scrolling, and inking. A flick can be a unidirectional pen gesture. A flick can be characterized by high speed and a high degree of straightness. A flick can be identified by its direction. Flicks can be made in eight directions corresponding to the cardinal and secondary compass directions. An action or flick action is the action or shortcut performed in response to a flick. Flicks are mapped to actions. FIG. 6 shows a diagram of eight pen flicks that correspond to their flick actions. These flicks can be transmitted to the server 106 to interact with the shared session window.

Turning now to web conferencing applications and shared session windows, in many instances, web conferencing applications display a main application window that can permit at least one user to display application output. Gesture support can be provided to these web conferencing applications. Furthermore, the methods and systems can provide web conferencing applications with high-fidelity multi-touch support such that the web conferencing applications can permit multiple users to interact with a shared session window at substantially the same time. For example, one conference member can display a shared session window and multiple, additional conference members can interact with and modify the shared session window at substantially the same time.

In some embodiments, the methods and systems described herein can be extended to shadowing, i.e., displaying a window of an application executing on a server 106, the shadowee. Instances of virtual channels can handle gesture input thereby permitting shadowers and shadowees to interact with a shared session window generated and displayed within a shared session using touch input. In some embodiments, the virtual channel instances can be multiple instances of the same virtual channel (e.g. a seamless virtual channel or a control virtual channel).

Input can come in on each virtual channel instance and can be reconciled or aggregated by a master virtual channel in the server's 106 session. Accomplishing this can include reconciling the capabilities of the participants 102 and server 106 (e.g. the shadowers and shadowees) and aggregating each party's capabilities. Reconciling different client device 102 capabilities, in some embodiments, may comprise aggregating the capabilities of all the devices 102, instead of defaulting to a least-common-denominator rule. For example, if a first device 102 supports two simultaneous multi-touch inputs and a second device 102 supports ten simultaneous multi-touch inputs, then reconciling the capabilities of this first and second device may comprise a shared session capable of twelve simultaneous multi-touch inputs.

In some embodiments, combining multi-touch input generated by shadowers and a shadowee can include employing a mapping table that can map a user's (e.g. a shadower or shadowee) touch identifier to a user session identifier (e.g. a Citrix-generated session-unique identifier). In one embodiment, this mapping table may be used to avoid collision between touch contact sequence IDs from different users. For example, a mapping table can be used to map from actual participant touch ID to a server-generated session-unique ID. In another embodiment, the mapping table may be used to reconcile primary touch points in a multi-touch environment. For example, a first touch point reported from the participant 102 as primary may be designated as the primary touch point, while all others remain secondary.

In other embodiments, combining multi-touch input generated by shadowers and a shadowee can include aligning timestamps of gesture and touch input from different users. This can be accomplished by collecting the current time from each user as part of a capability negotiation. The differences between each user's time and a base time for the shadowee can be determined. These determined time differences can then be used to normalize the timestamp for gesture and touch input by subtracting the difference between the user's time and the base time.

In other embodiments, combining or aggregating gesture input generated by shadowers and a shadowee can include discarding input. The server 106 may determine whether to process each of the multiple inputs. In one example, the server 106 may determine whether the difference in timestamps between two inputs is below a specified threshold. For example, if two inputs are received within one second or less of each other, only one of the two inputs may be processed to avoid potential conflicts in modifying the application display or other output, or executing an application functionality. Various thresholds may be used and the threshold applied may depend on the type of input, functionality of the application or resulting modification to the application. For example, zooming an application window may require two seconds to complete, e.g., required time for the visual animation. Accordingly, other input received within two seconds of a zoom input may be discarded or otherwise ignored.

If one or more inputs are to be ignored, the server 106 may select inputs to be processed. For example, the server 106 may always process the shadowee's inputs over a shadower's input. In another example, the server may process the first input (time-wise) of two or more conflicting inputs. Other rules may, alternatively or additionally, be implemented to resolve conflicts between inputs. The server 106 may subsequently process the received inputs or selected inputs within the context of the application, e.g., to affect a function or display of the application, and transmit the output to the participating devices 102 and users.

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:

1. A method for providing a shared session environment comprising:
   facilitating the establishment of a first connection with a first remote computing device to provide access to a shared session window to the first device;
   facilitating the establishment of a second connection with a second remote computing device to provide access to the shared session window to the second device;
   determining a first time difference between a current time according to the first remote computing device and a base current time;
   determining a second time difference between a current time according to the second remote computing device and the base current time;
   negotiating gesture capabilities with the first and second remote computing devices;
   receiving via the first connection data corresponding to a first gesture inputted at the shared session window displayed at the first device to interact with the shared session window, the first gesture being associated with a first timestamp generated at the first remote computing device;
   receiving via the second connection data corresponding to a second gesture inputted at the shared session window displayed at the second device to interact with the shared session window, the second gesture being associated with a second timestamp generated at the second remote computing device;
   reconciling the data corresponding to the first and second gestures to generate a modification instruction representing the operations defined by the interactions with the shared session windows at the first and second remote computing devices, reconciling the data comprising normalizing the first timestamp based on the first time difference and normalizing the second timestamp based on the second time difference, wherein normalizing the first timestamp includes subtracting the first time difference from the first timestamp, and wherein normalizing the second timestamp includes subtracting the second time difference from the second timestamp; and
   transmitting a modified shared session window over the first and second connections to the first and second computing devices.

2. The method of claim 1 further comprising:
   obtaining the current time according to the first remote computing device from the first remote computing device and the current time according to the second remote computing device from the second remote computing device.

3. The method of claim 1 wherein the reconciling step comprises employing a mapping table that maps the data corresponding to the first gesture to a first shared session command and that maps the data corresponding to the second gesture to a second shared session command.

4. The method of claim 1 wherein the first connection comprises a screen sharing channel and a first input channel and the second connection comprises the screen sharing channel and a second input channel.

5. The method of claim 1 wherein the data corresponding to the first gesture is raw multi-touch information.

6. The method of claim 5 wherein the reconciling step further comprises formatting the raw multi-touch information into a format compatible with the shared session window.

7. The method of claim 6 wherein the formatting accounts for the negotiated gesture capabilities for the first remote computing device.

8. The method of claim 1 wherein the negotiating step comprises aggregating the capabilities of the first and second remote computing devices.

9. The method of claim 8 wherein the aggregating the capabilities comprises summing the number of touch inputs the first remote computing device is capable of receiving and the number of touch inputs the second remote computing device is capable of receiving.

10. The method of claim 1 wherein the data corresponding to the first gesture is formatted for interpretation through processing of raw multi-touch information at the first remote computing device.

11. The method of claim 1 wherein the data corresponding to the first gesture is a flick.

12. The method of claim 1 wherein the data corresponding to the first gesture is a stylus event coming from a pen or touch digitizer.

13. The method of claim 1 wherein the reconciling step further comprises queuing, tossing, and/or coalescing the first and/or second gestures in low-bandwidth network conditions and/or slow-processing applications in the shared session.

14. The method of claim 1 wherein the reconciling step further comprises, determining a difference in time of receipt between the first and second gestures; and discarding one of the first and second gestures in response to determining that the difference in time is lower than a threshold amount of time.

15. A method for providing a shared session environment comprising:
   facilitating the establishment of a first connection with a first remote computing device to provide access to a shared session window to the first device;
   facilitating the establishment of a second connection with a second remote computing device to provide access to the shared session window to the second device;
   determining a first time difference between a current time according to the first remote computing device and a base current time;
   determining a second time difference between a current time according to the second remote computing device and the base current time;
   negotiating gesture capabilities with the first remote computing device;
   receiving via the first connection data corresponding to a gesture inputted at the shared session window displayed at the first device to interact with the shared session window, the first gesture being associated with a first timestamp generated at the first remote computing device;
   receiving via the second connection data corresponding to a non-gesture inputted at the shared session window displayed at the second device to interact with the shared session window, the second gesture being associated with a second timestamp generated at the second remote computing device;

reconciling the data corresponding to the gesture and non-gesture to generate a modification instruction representing the operations defined by the interactions with the shared session windows at the first and second remote computing devices, reconciling the data comprising normalizing the first timestamp based on the first time difference and normalizing the second timestamp based on the second time difference, wherein normalizing the first timestamp includes subtracting the first time difference from the first timestamp, and wherein normalizing the second timestamp includes subtracting the second time difference from the second timestamp; and transmitting a modified shared session window over the first and second connections to the first and second computing devices.

16. The method of claim 15 further comprising:
obtaining the current time according to the first remote computing device from the first remote computing device and the current time according to the second remote computing device from the second remote computing device.

17. The method of claim 15 wherein the reconciling step comprises employing a mapping table that maps the data corresponding to the gesture to a first shared session command and that maps the data corresponding to the non-gesture to a second shared session command.

18. The method of claim 15 wherein the first connection comprises a screen sharing channel and a first input channel and the second connection comprises the screen sharing channel and a second input channel.

19. The method of claim 15 wherein the non-gesture is a mouse-click or a keyboard entry.

20. The method of claim 15 wherein the data corresponding to the gesture is raw multi-touch information.

21. The method of claim 20 wherein the reconciling step further comprises formatting the raw multi-touch information into a format compatible with the shared session window.

22. The method of claim 21 wherein the formatting accounts for the negotiated gesture capabilities for the first remote computing device.

23. The method of claim 15 wherein the negotiating step comprises aggregating the capabilities of the first and second remote computing devices.

24. The method of claim 23 wherein the aggregating the capabilities comprises summing the number of touch inputs the first remote computing device is capable of receiving and the number of touch inputs the second remote computing device is capable of receiving.

25. The method of claim 15 wherein the data corresponding to the gesture is formatted for interpretation through processing of raw multi-touch information at the first remote computing device.

26. The method of claim 15 wherein the data corresponding to the gesture is a flick.

27. The method of claim 15 wherein the data corresponding to the gesture is a stylus event coming from a pen or touch digitizer.

28. The method of claim 15 wherein the reconciling step further comprises queuing, tossing, and/or coalescing the gesture and non-gesture in low-bandwidth network conditions and/or slow-processing applications in the shared session.

29. The method of claim 15 wherein the reconciling step further comprises, determining a difference in time of receipt between the gesture and non-gesture; and discarding one of the gesture and non-gesture in response to determining that the difference in time is lower than a threshold amount of time.

30. A device for providing a shared session environment comprising: a network interface configured to:
facilitate the establishment of a first connection with a first remote computing device to provide access to a shared session window to the first device, and
facilitate the establishment of a second connection with a second remote computing device to provide access to the shared session window to the second device; and
a processor configured to execute software to:
determine a first time difference between a current time according to the first remote computing device and a base current time,
determine a second time difference between a current time according to the second remote computing device and the base current time,
negotiate gesture capabilities with the first and second devices,
receive from the first connection data corresponding to a first gesture inputted at the shared session window displayed at the first device to interact with the shared session window, the first gesture being associated with a first timestamp generated at the first remote computing device,
receive from the second connection data corresponding to a second gesture inputted at the shared session window displayed at the second device to interact with the shared session window, the second gesture being associated with a second timestamp generated at the second remote computing device,
reconcile the data corresponding to the first and second gestures to generate a modification instruction representing the operations defined by the interactions with the shared session windows at the first and second remote computing devices, reconciling the data comprising normalizing the first timestamp based on the first time difference and normalizing the second timestamp based on the second time difference, wherein normalizing the first timestamp includes subtracting the first time difference from the first timestamp, and wherein normalizing the second timestamp includes subtracting the second time difference from the second timestamp, and
transmit a modified shared session window over the first and second connections to the first and second computing devices.

31. The device of claim 30 wherein the processor is configured to further execute software to:
obtain the current time according to the first remote computing device from the first remote computing device and the current time according to the second remote computing device from the second remote computing device.

32. The device of claim 30 wherein the reconcile instruction comprises employing a mapping table that maps the data corresponding to the first gesture to a first shared session command and that maps the data corresponding to the second gesture to a second shared session command.

33. The device of claim 30 wherein the first connection comprises a screen sharing channel and a first input channel and the second connection comprises the screen sharing channel and a second input channel.

34. The device of claim 30 wherein the data corresponding to the first gesture is raw multi-touch information.

35. The device of claim 34 wherein the reconciling step further comprises formatting the raw multi-touch information into a format compatible with the shared session window.

36. The device of claim 35 wherein the formatting accounts for the negotiated gesture capabilities for the first remote computing device.

37. The device of claim 30 wherein the negotiate instruction comprises aggregating the capabilities of the first and second remote computing devices.

38. The method of claim 37 wherein the aggregating the capabilities comprises summing the number of touch inputs the first remote computing device is capable of receiving and the number of touch inputs the second remote computing device is capable of receiving.

39. The device of claim 30 wherein the data corresponding to the first gesture is formatted for interpretation through processing of raw multi-touch information at the first remote computing device.

40. The device of claim 30 wherein the data corresponding to the first gesture is a flick.

41. The device of claim 30 wherein the data corresponding to the first gesture is a stylus event coming from a pen or touch digitizer.

42. The device of claim 30 wherein the software executing the reconcile instruction further queues, tosses, and/or coalesces the first and/or second gestures in low-bandwidth network conditions and/or slow-processing applications in the shared session.

43. The device of claim 30 wherein the reconciling instruction comprises, determining a difference in time of receipt between the first and second gestures; and discarding one of the first and second gestures in response to determining that the difference in time is lower than a threshold amount of time.

44. A device for providing a shared session environment comprising: a network interface configured to:
    facilitate the establishment of a first connection with a first remote computing device to provide access to a shared session window to the first device, and
    facilitate the establishment of a second connection with a second remote computing device to provide access to the shared session window to the second device; and
a processor configured to execute software to:
    determine a first time difference between a current time according to the first remote computing device and a base current time,
    determine a second time difference between a current time according to the second remote computing device and the base current time,
    negotiate gesture capabilities with the first device,
    receive from the first connection data corresponding to a gesture inputted at the shared session window displayed at the first device to interact with the shared session window, the first gesture being associated with a first timestamp generated at the first remote computing device,
    receive from the second connection data corresponding to a non-gesture inputted at the shared session window displayed at the second device to interact with the shared session window, the second gesture being associated with a second timestamp generated at the second remote computing device,
    reconcile the data corresponding to the gesture and non-gesture to generate a modification instruction representing the operations defined by the interactions with the shared session windows at the first and second remote computing devices, reconciling the data comprising normalizing the first timestamp based on the first time difference and normalizing the second timestamp based on the second time difference, wherein normalizing the first timestamp includes subtracting the first time difference from the first timestamp, and wherein normalizing the second timestamp includes subtracting the second time difference from the second timestamp, and
    transmit a modified shared session window over the first and second connections to the first and second computing devices.

45. The device of claim 44 wherein the processor is configured to further execute software to:
    obtain the current time according to the first remote computing device from the first remote computing device and the current time according to the second remote computing device from the second remote computing device.

46. The device of claim 44 wherein the reconcile instruction comprises employing a mapping table that maps the data corresponding to the multi-touch gesture to a first shared session command and that maps the data corresponding to the action to a second shared session command.

47. The device of claim 44 wherein the first connection comprises a screen sharing channel and a first input channel and the second connection comprises the screen sharing channel and a second input channel.

48. The device of claim 44 wherein the non-gesture is a mouse-click or a keyboard entry.

49. The device of claim 44 wherein the data corresponding to the first gesture is raw multi-touch information.

50. The device of claim 49 wherein the reconciling step further comprises formatting the raw multi-touch information into a format compatible with the shared session window.

51. The device of claim 50 wherein the formatting accounts for the negotiated gesture capabilities for the first remote computing device.

52. The device of claim 44 wherein the negotiate instruction comprises aggregating the capabilities of the first and second remote computing devices.

53. The device of claim 52 wherein the aggregating the capabilities comprises summing the number of touch inputs the first remote computing device is capable of receiving and the number of touch inputs the second remote computing device is capable of receiving.

54. The device of claim 44 wherein the data corresponding to the gesture is formatted for interpretation through processing of raw multi-touch information at the first remote computing device.

55. The device of claim 44 wherein the data corresponding to the gesture is a flick.

56. The device of claim 41 wherein the data corresponding to the gesture is a stylus event coming from a pen or touch digitizer.

57. The device of claim 44 wherein the software executing the reconcile instruction further queues, tosses, and/or coalesces the gesture and non-gesture in low-bandwidth network conditions and/or slow-processing applications in the shared session.

58. The device of claim 44 wherein the reconciling instruction comprises, determining a difference in time of receipt between the gesture and non-gesture; and discarding one of the gesture and non-gesture in response to determining that the difference in time is lower than a threshold amount of time.

59. A method for providing a shared session environment comprising:
- facilitating the establishment of a first connection with a first remote computing device to provide access to a shared session window to the first device, wherein the shared session window is a window of an application executing on a server computer;
- facilitating the establishment of a second connection with a second remote computing device to provide access to the shared session window to the second device;
- determining a first time difference between a current time according to the first remote computing device and a base current time, wherein the base current time is a current time of the server computer;
- determining a second time difference between a current time according to the second remote computing device and the base current time;
- negotiating gesture capabilities with the first and second remote computing devices;
- receiving via the first connection data corresponding to a first gesture inputted at the shared session window displayed at the first device to interact with the shared session window, the first gesture being associated with a first timestamp generated at the first remote computing device;
- receiving via the second connection data corresponding to a second gesture inputted at the shared session window displayed at the second device to interact with the shared session window, the second gesture being associated with a second timestamp generated at the second remote computing device;
- reconciling the data corresponding to the first and second gestures to generate a modification instruction representing the operations defined by the interactions with the shared session windows at the first and second remote computing devices, reconciling the data comprising normalizing the first timestamp based on the first time difference and normalizing the second timestamp based on the second time difference; and
- transmitting a modified shared session window over the first and second connections to the first and second computing devices.

60. The method of claim 59, further comprising:
- wherein normalizing the first timestamp includes subtracting the first time difference from the first timestamp; and
- wherein normalizing the second timestamp includes subtracting the second time difference from the second timestamp.

61. The method of claim 1, further comprising:
- wherein the application executing on the server computer provides a shared electronic whiteboard space within the shared session window, the shared electronic whiteboard space enabling the user of the first remote computer device and the user of the second remote computing device to interact with content displayed in the shared session window using gestures made up of multi-touch inputs to the first device and second device, the content being displayed in the shared session window based on the timestamps.

62. The method of claim 59, further comprising:
- wherein determining the current time according to the first remote computing device includes collecting the current time from a user of the first remote computing device during the step of negotiating gesture capabilities with the first and second remote computing devices; and
- wherein determining the current time according to the second remote computing device includes collecting the current time from a user of the second remote computing device during the step of negotiating gesture capabilities with the first and second remote computing devices.

* * * * *